United States Patent
Zhang et al.

(10) Patent No.: US 12,552,305 B2
(45) Date of Patent: Feb. 17, 2026

(54) HEATING AND HEAT-DISSIPATION SYNERGISTIC THERMAL CONTROL DEVICE AND AUTOMOBILE SEAT

(71) Applicant: AEW TECHNOLOGY GROUP CO., LTD., Hebei (CN)

(72) Inventors: Haitao Zhang, Hebei (CN); Hua Wang, Hebei (CN)

(73) Assignee: AEW TECHNOLOGY GROUP CO., LTD., Langfang (CN)

( * ) Notice: Subject to any disclaimer, the term of this patent is extended or adjusted under 35 U.S.C. 154(b) by 249 days.

(21) Appl. No.: 18/569,846

(22) PCT Filed: Apr. 12, 2023

(86) PCT No.: PCT/CN2023/087849
§ 371 (c)(1),
(2) Date: Dec. 13, 2023

(87) PCT Pub. No.: WO2023/207599
PCT Pub. Date: Nov. 2, 2023

(65) Prior Publication Data
US 2024/0270141 A1 Aug. 15, 2024

(30) Foreign Application Priority Data

Apr. 27, 2022 (CN) .......................... 202210452575.1

(51) Int. Cl.
*B60N 2/56* (2006.01)
*A61H 9/00* (2006.01)
(Continued)

(52) U.S. Cl.
CPC ........... *B60N 2/976* (2018.02); *A61H 9/0078* (2013.01); *B60N 2/5642* (2013.01);
(Continued)

(58) Field of Classification Search
CPC ........ B60N 2/976; B60N 2/914; B60N 2/665; A61H 2201/0149; A61H 9/0078
See application file for complete search history.

(56) References Cited

U.S. PATENT DOCUMENTS 4,655,505 A * 4/1987 Kashiwamura ........ B60N 2/976
297/284.6
10,034,631 B1 * 7/2018 Gallagher ............ B60N 2/0023
(Continued)

FOREIGN PATENT DOCUMENTS

| CN | 104340097 A | 2/2015 |
|---|---|---|
| CN | 204472629 U | 7/2015 |

(Continued)

OTHER PUBLICATIONS

China State Intellectual Property, International Search Report, Application No. PCT/CN2023/087849, Mailed Jun. 26, 2023, 3 pages.
(Continued)

*Primary Examiner* — Shin H Kim
(74) *Attorney, Agent, or Firm* — Ziegler IP Law Group, LLC.

(57) ABSTRACT

Heating and heat-dissipation synergistic thermal control device and automobile seat include: heating system, pneumatic massage system, heat dissipation system and control system. The heating system includes heating cushion layer. The heating cushion layer has several heating areas. Each heating area is disposed with independently controlled islanding heating units. The pneumatic massage system includes airbag layer. The airbag layer has airbag groups disposed corresponding to each heating area. Each airbag group has the first airbag body. The first airbag body is connected with driving device. When the first airbag body is in inflatable state, second suspension area is formed between peripheral side of the first airbag body and the heating cushion layer and the seat body. The heat dissipation system
(Continued)

dissipates heat of the second suspension area; and the control system controls the heating system, pneumatic massage system and heat dissipation system to operate synergistically with the set control strategy.

20 Claims, 12 Drawing Sheets

(51) Int. Cl.
*A61N 2/02* (2006.01)
*B60N 2/90* (2018.01)
(52) U.S. Cl.
CPC .... *B60N 2/5678* (2013.01); *A61H 2201/0149* (2013.01); *A61H 2201/0207* (2013.01); *A61H 2201/0228* (2013.01); *A61H 2201/0242* (2013.01); *A61H 2201/1238* (2013.01); *A61H 2201/1654* (2013.01); *A61H 2201/5007* (2013.01); *A61H 2201/5082* (2013.01); *A61H 2203/0431* (2013.01); *A61H 2205/081* (2013.01)

(56) References Cited

U.S. PATENT DOCUMENTS

| | | | | |
|---|---|---|---|---|
| 11,135,950 | B2* | 10/2021 | Migneco | B60N 2/665 |
| 11,623,597 | B1* | 4/2023 | Jost | B60N 2/665 |
| | | | | 280/735 |
| 11,685,329 | B2* | 6/2023 | Muralidharan | B60R 21/233 |
| | | | | 280/730.1 |
| 12,024,298 | B2* | 7/2024 | Schlosser | B64D 11/06 |
| 12,139,057 | B1* | 11/2024 | White | B60N 2/7082 |
| 2016/0229320 | A1* | 8/2016 | Lem | B60N 2/976 |
| 2019/0353184 | A1 | 11/2019 | Uno et al. | |
| 2020/0188211 | A1* | 6/2020 | Ellermann | B60Q 3/233 |
| 2020/0255151 | A1* | 8/2020 | Schlosser | B64D 11/064 |
| 2021/0170926 | A1 | 6/2021 | Migneco et al. | |
| 2021/0300224 | A1 | 9/2021 | Tait et al. | |
| 2024/0270141 | A1* | 8/2024 | Zhang | B60N 2/976 |

FOREIGN PATENT DOCUMENTS

| | | |
|---|---|---|
| CN | 106114312 A | 11/2016 |
| CN | 110025162 A | 7/2019 |
| CN | 210027133 U | 2/2020 |
| CN | 215705839 U | 2/2022 |
| CN | 216374298 U | 4/2022 |
| CN | 115179827 A | 10/2022 |
| DE | 102009031331 A1 | 8/2010 |
| DE | 102013014039 A1 | 2/2015 |
| DE | 102013216885 A1 | 2/2015 |
| DE | 102015009720 A1 | 2/2017 |
| DE | 102019212803 A1 | 3/2021 |
| JP | 2007260173 A | 10/2007 |
| JP | 2021146976 A | 9/2021 |
| WO | 2013170621 A1 | 11/2013 |

OTHER PUBLICATIONS

China State Intellectual Property, Written opinion of the International Searching Authority, Application No. PCT/CN2023/087849, Mailed Jun. 26, 2023, 4 pages.

State Intellectual Property Office, First Examination Notice 1. In response to the applicant's request for substantive, Application No. 202210452575.1, Mailed May 15, 2023, 8 pages.

State Intellectual Property Office, Notice of Grant of Invention Patent Rights 1. According to the provisions of Article 39, Application No. 202210452575.1, Mailed Jul. 31, 2023, 1 page.

* cited by examiner

HEATING AND HEAT-DISSIPATION SYNERGISTIC THERMAL CONTROL DEVICE AND AUTOMOBILE SEAT

CROSS-REFERENCE TO RELATED APPLICATIONS

The present disclosure claims priority to Chinese patent application No. 202210452575.1, filed with the Chinese Patent Office on Apr. 27, 2022, entitled "Heating and Heat-Dissipation Synergistic Thermal Control Device and Automobile Seat", the entire contents of which are incorporated herein by reference.

TECHNICAL FIELD

The present disclosure relates generally to the technical field of seat hot moxibustion, and specifically to a heating and heat-dissipation synergistic thermal control device and an automobile seat.

BACKGROUND ART

With the technological development in the field of vehicular transportation, people have higher and higher requirements for ride comfort of engineering vehicles. Then people proposed an automobile-seat heating-and-massage system, which is able to heat and massage meanwhile and has a higher heating power density. When a massage air bag is jacking, a heating cushion between the massage air bag and surface cover is jacked. The heating cushion starts a heating mode, so the body feels a hot jacking effect, which helps body improve a sense of ride comfort and relieve muscle fatigue.

The base materials of the chair surface cover and even the seat heating cushion both have a certain thermal conductivity, and also various local heating areas need a certain duration to dissipate heat. After one or several operation cycles of the massage airbag bodies arranged on the various position of the seat surface and the local heating areas, the entire seat surface will have a relative uniform temperature, which affects the massage and heating effect.

SUMMARY

The present disclosure provides a heating and heat-dissipation synergistic thermal control device and automobile seat, which can improve the massage heating effect.

Embodiments of the present disclosure may be realized as follows.

In a first aspect, the present disclosure provides a heating and heat-dissipation synergistic thermal control device, including:

heating system, wherein the heating system includes a heating cushion layer which is configured to be mounted on the seat body, the heating cushion layer has a breathable base material and several independently controlled heating areas which are arrayed and arranged on the breathable base material, and each of the heating areas is arranged with at least one islanding heating unit;

a pneumatic massage system, wherein the pneumatic massage system includes an airbag layer which is arranged on one side of the heating cushion layer close to the seat body, the airbag layer has airbag groups arranged corresponding to each of the heating area positions, each of the airbag groups independently controls and has at least one first airbag body arranged corresponding to the islanding heating unit, the first airbag body is connected to a driving device, and the driving device is configured to switch an inflatable state and a deflated state of the first airbag body, wherein when the first airbag body is in the inflatable state, a second suspension area is formed between a peripheral side of the first airbag body and the heating cushion layer and the seat body;

a heat dissipation system, wherein the heat dissipation system includes a heat dissipation driving device and an air channel structure, the air channel structure is communicated with the breathable base material, the second suspension area and the heat dissipation driving device, and when the heat dissipation driving device is in operation, air flows from the air channel structure to the heat dissipation driving device; and a control system, wherein the control system is configured to control the heating system, the driving device and the heat dissipation system with a set control strategy to work synergistically; the set control strategy includes that, at least during the setting time, the heating system, the pneumatic massage system and heat dissipation system work simultaneously, and during the setting time, the heat dissipation system discharges partial the heat at the position of the second suspension area corresponding to the heating system with air flow from the heating and heat-dissipation synergistic thermal control device.

Optionally, when the first airbag body is in the inflatable state and the corresponding islanding heating unit of the first airbag body is in a heating state, the first airbag body drives the heating area to protrude outwardly, so as to form a hot jacking structure configured to contact with the man body. The first suspension area is formed between the peripheral side of the hot jacking structure and the heating cushion layer and the man body, wherein the first suspension area is communicated with the second suspension area, so as to while the heat dissipation system is working, the heat dissipation system discharges the heat at the position corresponding to the first suspension area with air flow from the heating and heat-dissipation synergistic thermal control device.

Optionally, the heating cushion layer is installed with an breathable layer near the man body side; the breathability of the breathable layer corresponding to the area of the hot jacking structure is smaller the air permeability of the adjacent area; and when the heat dissipation system is working, the heat dissipation system can discharge the heat of positions of the first suspension area and the second suspension area corresponding to the breathable layer along with the air flow from the heating and heat-dissipation synergistic thermal control device.

Optionally, the driving device includes an air pump and a control valve group, wherein the air pump is connected between the gas source and the control valve group.

Optionally, each of the airbag groups with the corresponding islanding heating unit is a group of synergy unit; and the set control strategy includes: controlling the synergy unit to switch between the first state and the second state in response to an external start signal, wherein when in the first state, the islanding heating unit is turned on, and the driving device switches the first airbag body to the inflatable state;

when in the second state the islanding heating unit is turned off, and the driving device switches the first airbag body to the deflated state.

Optionally, the method of controlling the synergy unit to switch between the first state and the second state is specified as follows:
- s1: sequentially controlling one or more of the synergy units to switch between the first state and second state, until all of the synergy units complete the switching of the first state and the second state; and
- s2: repeating step s1, until the control system stops in response to an external stop signal or meeting a set condition.

Optionally, the set control strategy further includes:
controlling the heat dissipation system to be turned on after determining that the step s1 has been carried out m times, wherein m≥1; or
controlling the heat dissipation system to be turned on after a time t1 of an initial control moment; and the initial control moment is a start moment in response to the external start signal, t1 is a set value and t1≥0.

Optionally, the set control strategy further includes: controlling the heat dissipation system to be turned off after a t2 duration of a terminal control moment; and the terminal control moment is a stopping moment of the step s2, wherein t2 is the set value and t2≥0.

Optionally, the heating and heat-dissipation synergistic thermal control device further includes a sensor unit, wherein the sensor unit includes a first temperature sensor, a second temperature sensor and a third temperature sensor, wherein
- the first temperature sensor is configured to measure the temperature of the heating area; the second temperature sensor is configured to measure the temperature of a reference area, the reference area is located between two of the adjacent heating areas;
- the third temperature sensor is configured to measure the temperature of the breathable layer;
- the control system is further configured to: controlling the heat dissipation system to be turned on, when determining that the temperature of the heating area is greater than or equal to the temperature of the reference area by i° C., wherein i is the set value and i≥0; and
- controlling the heat dissipation system to be turned off when determining that the surface temperature is ≤j° C.

Optionally, on the breathable layer and corresponding to the hot jacking structure have the air hole, and the breathable layer is located at the outer peripheral side of the hot jacking structure and disposed with a plurality of vent holes.

Optionally, the air permeability of the breathable layer corresponding to the position of the hot jacking structure is less than the air permeability at the position of the breathable layer at the outer peripheral side area of the hot jacking structure.

Optionally, the seat body is arranged with a pat body layer; the heating cushion layer is mounted on the side of the pat body layer away from the seat body; and the air channel structure includes an air circulation hole arranged on the pat body layer.

Optionally, the air channel structure includes a wind guide structure arranged between one side of the heating cushion layer near the seat body and the heat dissipation system.

Optionally, the breathable base material is arranged with heating wires, the heating wire is densely arranged to form the heating area.

Optionally, the heating wires in each of the heating areas are independently connected with heating control circuits.

In a second aspect, the present disclosure provides an automobile seat which includes a seat body, the seat body has a seat cushion and a back, and the seat cushion and/or back are/is mounted with the heating and heat-dissipation synergistic thermal control device as described foregoing.

For example, beneficial effects of embodiments of the present disclosure are as follows.

Since the airbag group is disposed correspondingly to the heating area, and the airbag group and the heating unit on the heating area are independently controlled, when the driving device controls the airbag group to be inflated, the first airbag body can drive the heating area of the heating cushion layer to jack, so as to realize a role of hot moxibustion. Between the peripheral side of the first airbag body, the heating cushion layer and the seat body, the second suspension area is formed, so under the control of the set control strategy, that is, at least in the setting time, the heating system, the pneumatic massage system and the heat dissipation system work at the same time, and thus during the setting time, the heat dissipation system discharges the partial heat at the position of the second suspension area corresponding to the heating system along with the air flow from the heating and heat-dissipation synergistic thermal control device. The solution expands the temperature difference between the hot moxibustion area and the adjacent area, which highlights the effect of local hot jacking and meets the requirement that a hot sensation of the temperature difference of the hot moxibustion area is more prominent relative to the peripheral area, which solves a problem that under the cyclic working state, a heat accumulation will affect man body to perceive the massage heating temperature.

BRIEF DESCRIPTION OF DRAWINGS

Other features, objects and advantages of the present disclosure will become more obvious by reading the detailed description of the non-limiting embodiments with reference to the following drawings.

REFERENCE NUMBERS

Figure 1:
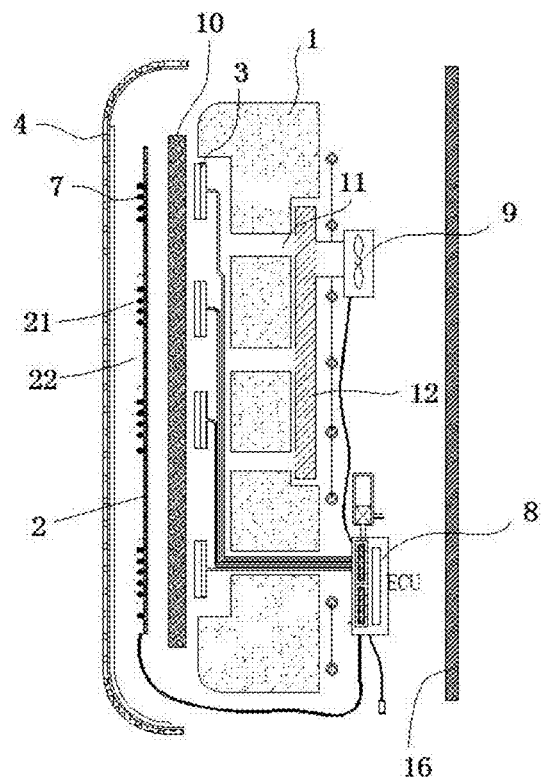
FIG. 1 shows a structure schematic diagram of the heating and heat-dissipation synergistic thermal control device provided in the embodiment.

1—pat body layer; 2—heating cushion layer; 3—first airbag body; 4—breathable layer; 5—hot jacking structure; 7—islanding heating unit; 8—driving device; 9—heat dissipation driving device; 10—air guide layer; 11—air circulation hole; 12—first wind guide bag; 13—seat body; 14—seat cushion; 15—back; 16—cover plate; 17—massage structure; 18—second airbag body; 19—heating cushion; 21—heating area; 22—reference area; 23—heating wire; 24—breathable base material; 41—vent hole; 42—air hole; 43—surface layer; 44—lining layer; 61—first suspension area; 62—second suspension area; 71—heating control circuit; 72—temperature sensor; 81—air pump; 82—control valve group; 83—gas source; 91—rotor fan; 100—heating and heat-dissipation synergistic thermal control device; 110—heating system; 120—pneumatic massage system; 121—airbag layer; 1211—airbag group; 122—synergy unit; 130—heat dissipation system; 131—air channel structure; 1311—wind guide structure; 140—control system; 150—sensor unit; 151—first temperature sensor; 152—second temperature sensor; 153—third temperature sensor; 191—second wind guide bag; 200—automobile seat.

DETAILED DESCRIPTION OF EMBODIMENTS

The present disclosure is further described in detail in conjunction with the following drawings and embodiments. It may be understood that the specific embodiments described herein are intended only to explain the related invention, and are not intended to limit the invention. It is also noted that, for ease of description, the drawings only shows the relevant portion of the invention.

It is noted that the embodiments and features in the embodiments in the present disclosure may be combined with each other when without conflict. The present disclosure will be described in detail below with reference to the drawings and in conjunction with the embodiments.

Referring to FIG. 1 to FIG. 8, a heating and heat-dissipation synergistic thermal control device 100 provided by the present disclosure includes: a heating system 110, a pneumatic massage system 120, a heat dissipation system 130 and a control system 140. The heating system 110 includes a heating cushion layer 2 which is configured to be mounted on the seat body 13, wherein the heating cushion layer 2 has the breathable base material 24 and a plurality of independently controlled heating areas 21 arrayed and arranged on the breathable base material 24, and each of the heating areas 21 is arranged with an islanding heating unit 7. The pneumatic massage system 120 includes the airbag layer 121 disposed at the side of the heating cushion layer 2 near the seat body 13, the airbag layer 121 has the airbag group 1211 that is disposed corresponding to the position of each of the heating areas 21, and each of the airbag groups 1211 is independently controlled and has at least one first airbag body 3 disposed corresponding to the islanding heating unit 7. The first airbag body 3 is connected to the driving device 8, wherein the driving device 8 is configured to switch between the inflatable state and the deflated state of the first airbag body 3; when the first airbag body 3 is in the inflatable state, the second suspension area 62 is formed between the peripheral side of the first airbag body 3 and the heating cushion layer 2 and the seat body 13. The heat dissipation system 130 includes the heat dissipation driving device 9 and the air channel structure 131, wherein the air channel structure 131 is connected with the breathable base material 24, the second suspension area 62 and the heat dissipation driving device 9, and when the heat dissipation driving device 9 is in operation, the air flows from the air channel structure 131 towards the heat dissipation driving device 9. The control system 140 is configured to control the heating system 110, the pneumatic massage system 120 and the heat dissipation system 130 to work synergistically with the set control strategy. The set control strategy includes that, at least during the setting time, the heating system 110, the pneumatic massage system 120 and the heat dissipation system 130 work simultaneously, and during the setting time, the heat dissipation system 130 discharges partial heat at the position of the second suspension area 62 corresponding to the heating system 110 along with the air flow from the heating and heat-dissipation synergistic thermal control device 100.

Specifically, the heating area 21 is an intensive heating area, i.e., a plurality of islanding heating units 7 are disposed in the heating area 21, so as to achieve the effect of intensive heating of the heating area. Specifically, the operation of the heating system 110 means that any one of the heating areas 21 powers on to produce heat, the operation of the heat dissipation system 130 means that the heat dissipation driving device 9 powers on and may drive the air flow, and the operation of the pneumatic massage system 120 means that the driving device 8 controls any one of the airbag groups 1211 to realize inflation or deflation action.

Figure 2:
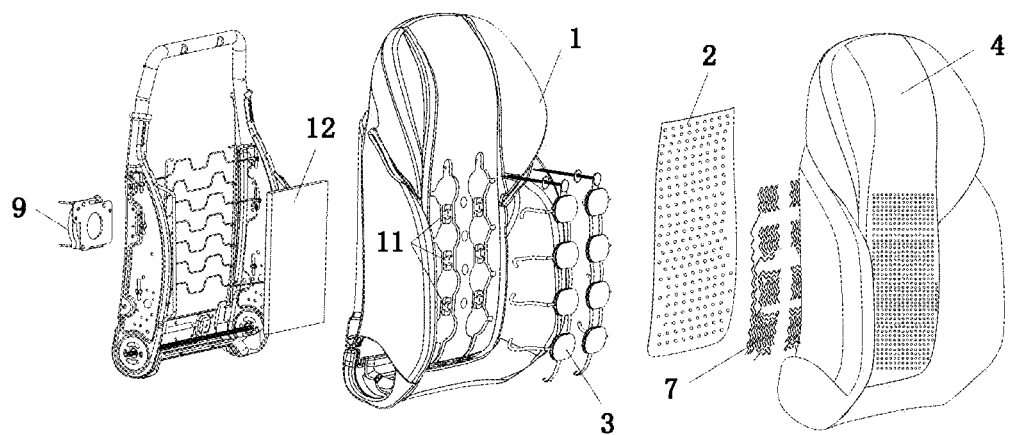
FIG. 2 shows an explosion structure schematic diagram of the heating and heat-dissipation synergistic thermal control device shown in FIG. 1.
Figure 3:
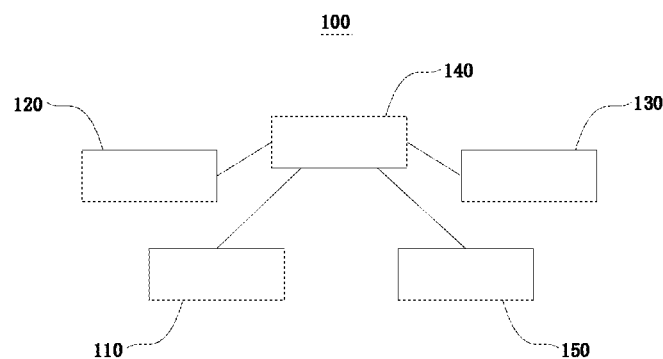
FIG. 3 shows a structure block diagram of the heating and heat-dissipation synergistic thermal control device provided in the embodiment.
Figure 4:
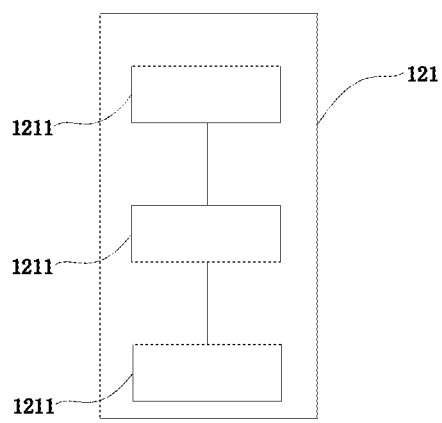
FIG. 4 shows a structure block diagram of the airbag layer provided in the embodiment.
Figure 5:
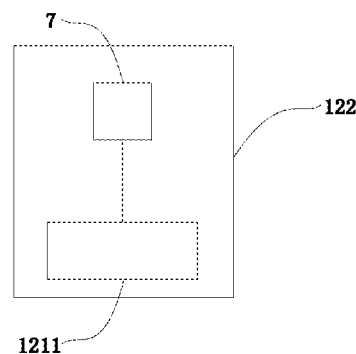
FIG. 5 shows a structure block diagram of the synergy unit provided in the embodiment.
Figure 6:
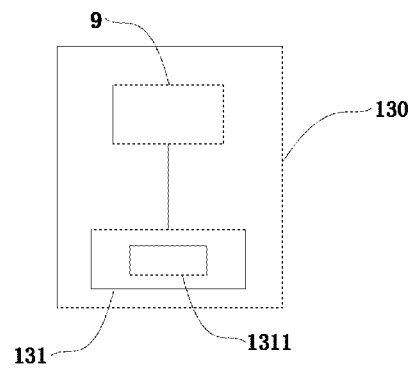
FIG. 6 shows a structure block diagram of the heat dissipation system provided in the embodiment.
Figure 7:
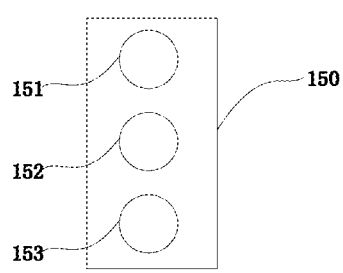
FIG. 7 shows a structure block diagram of the sensor unit provided in the embodiment.
Figure 8:
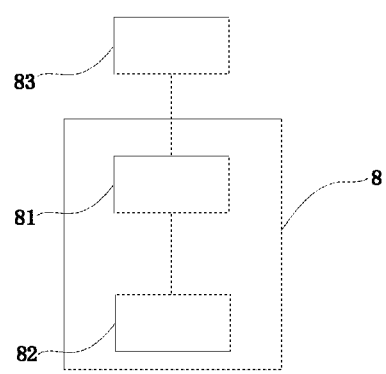
FIG. 8 shows a structure block diagram of the driving device and the gas source provided in this embodiment.
Figure 9:
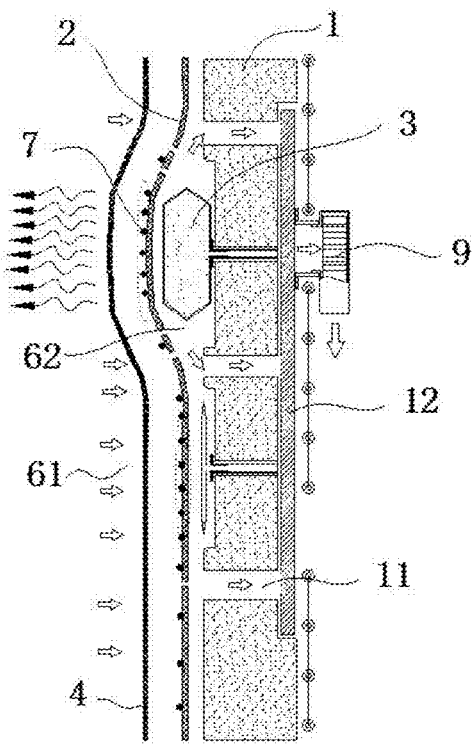
FIG. 9 shows a structure schematic diagram of the first airbag body jacking on the top shown in FIG. 1.

Specifically, as shown in FIG. 2 and FIG. 9, the heating cushion layer 2 includes the breathable base material 24, and the breathable base material 24 may be made of a breathable sponge, a three-dimensional knitted mesh or a non-woven fabric with pores. The air breathability of the breathable base material 24 corresponding to the heating area 21 (i.e., the area of the breathable base material corresponding to the islanding heating unit 7) is smaller than the air permeability of the adjacent areas.

Specifically, each of the heating areas 21 has at least one islanding heating unit 7, each of the airbag groups 1211 has at least one first airbag body 3, and the first airbag body 3 is disposed corresponding to the islanding heating unit 7. In some embodiments, for example, the heating area 21 has two islanding heating units 7, and each of the airbag groups 1211 has two first airbag bodies 3 which are disposed corresponding to the islanding heating units 7. In other embodiments, for example, the airbag group 1211 may also be the first airbag body 3 with a volume that can cover the two islanding heating units 7.

Optionally, the heating area 21 may be formed from the heating wires 23 being arranged on the breathable base material 24 densely and tortuously, i.e., the islanding heating unit 7 includes the heating wires 23. Each of heating areas 21 exists separately, and the heating wires 23 in each of the heating areas 21 are independently connected to the heating control circuit 71.

Figure 13:
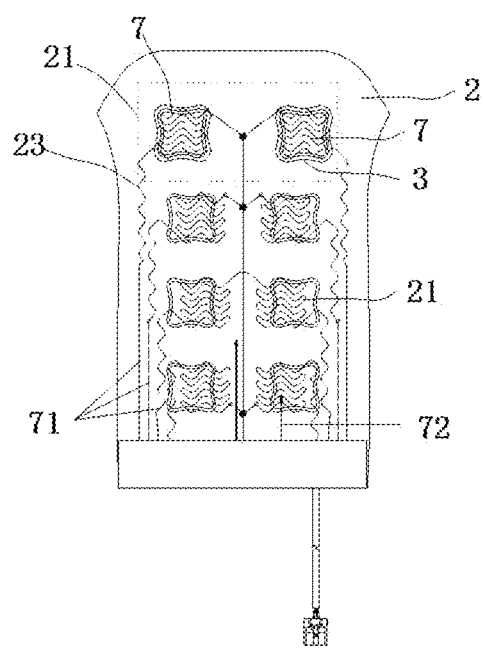
FIG. 13 shows a mounting structure schematic diagram of the heating cushion layer shown in FIG. 1.
Figure 14:
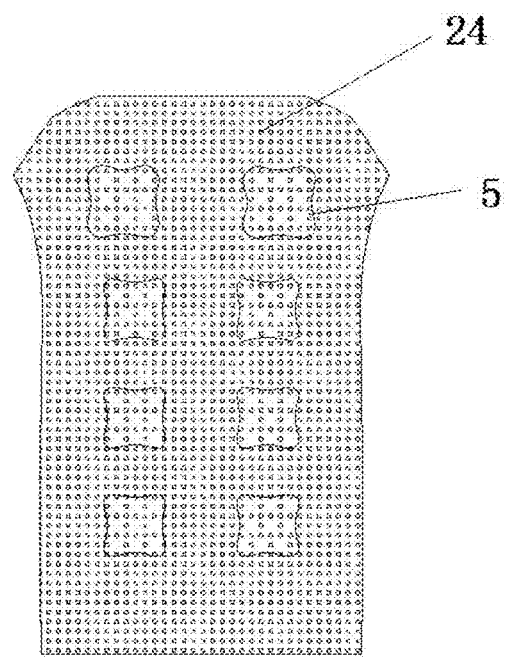
FIG. 14 shows a mounting structure schematic diagram of the heating cushion layer shown in FIG. 13.
Figure 15:
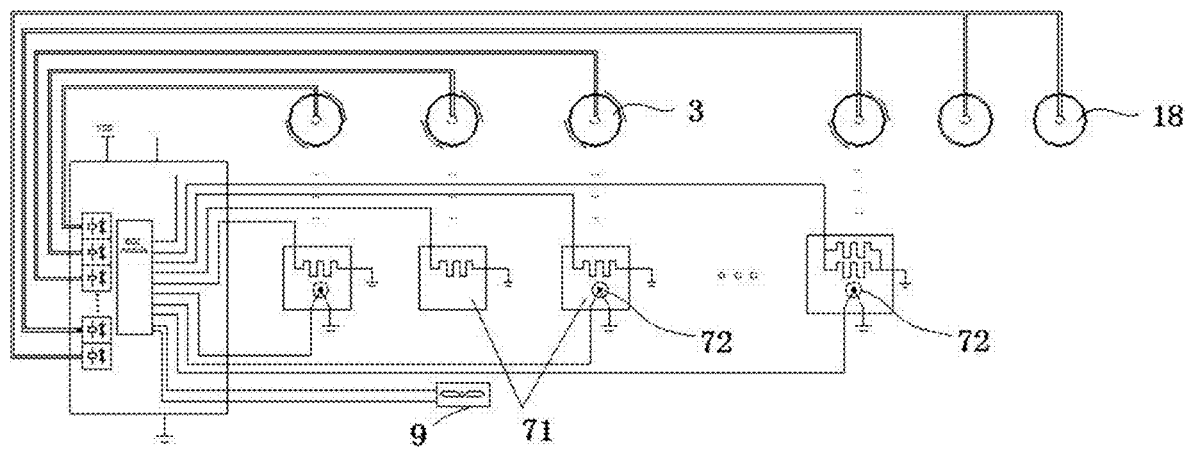
FIG. 15 shows a connection structure schematic diagram of the heating control circuit shown in FIG. 13.

Optionally, as shown in FIG. 13 to FIG. 15, each of the heating areas 21 is correspondingly disposed with the temperature sensor 72. Optionally, the temperature sensor 72 is an NTC sensor to facilitate the detection of the temperature of the heating area 21, and the heating wire 23 and the temperature sensor 72 are connected to the electrical connector through the conductive wiring harness, so as to form a heating control circuit 71. Specifically, each of the airbag groups 1211 and the heating areas 21 is independently controlled. The first airbag body 3 can play a jacking massage role during the process of switching between the inflatable state and the deflated state, and meanwhile cooperate with the corresponding heating area 21, such that the comfortable effect of the hot jacking can be realized, which is similar to the hot moxibustion effect.

Specifically, the driving device 8 may adopt one or more of the following structures.

1. The driving device 8 includes the air pump 81 and a plurality of control valves. The input end of the air pump 81 is connected with the gas source 83, the output end is connected to the control valve group 82, a plurality of independently controlled valve body are disposed in the control valve group 82, and the output end of the valve body is connected with an air hose, and is connected to the corresponding first airbag body 3 through the air hose, as shown in FIG. 1.

2. The driving device 8 includes an integrated pump valve structure. The input end of the pump valve structure is connected with the gas source, and the output end is disposed with the air hose corresponding to each of the airbag group 1211, and then the integrated pump valve structure is connected to the first airbag body 3 through the air hose.

3. The driving device 8 includes a plurality of air pumps 81. One air pump 81 controls an airbag group 1211 to switch between the inflatable state and the deflated state, and the air pump 81 and the airbag group 1211 are connected with the air hose.

Specifically, the gas source 83 includes, but is not limited to, atmospheric air or a gas tank storing a certain amount of gas. When the gas source 83 is the atmospheric air, the air pump 81 may compress an ordinary gas in the atmospheric gas to form a high pressure gas, and transport the high pressure gas; and when the gas source 83 is the gas tank, the air pump 81 can transport the gas in the gas tank.

Optionally, the heat dissipation system 130 includes the heat dissipation driving device 9 and the air channel structure 131. The heat dissipation driving device 9 may be the rotor fan 91, and the input end of the rotor fan 91 is communicated with the second suspension area 62. When the rotor fan 91 is in operation, the air is driven to flow, and the air flows from the position of the heating cushion layer 2 or the position of the chair surface of the seat body 13, through the air channel structure 131, to the air inlet of the rotor fan 91, and the air is discharged from the air outlet of the rotor fan 91 to the external atmosphere. Meanwhile, the partial heat of the heating cushion layer 2 and the chair surface of the seat body 13 is discharged along with the air flow to the external atmosphere. Specifically, the seat body 13 is provided thereon with a spring support, and the rotor fan 91 is mounted on the spring support. Optionally, a rotary speed of the rotor fan 91 is less than 3500 RPM in the heat dissipation action. Specifically, the control system includes an ECU control module; and the output end of the ECU control module is connected to the islanding heating unit 7, the driving device 8 and the heat dissipation system. Optionally, the input end of the ECU control module is connected to the car-body control unit.

Optionally, the control valve group 82 of the driving device 8 may be integrated in the ECU control module, or may be existed independently.

Optionally, the ECU control module may be an integrated control module, or may be composed of a plurality of submodules, such as a heating system sub-control module, a heat dissipation system sub-control module, a pneumatic massage system sub-control module, etc. Specifically, the integral heating cushion 19 is disposed between the heating cushion layer 2 and the airbag layer 121, and the integral heating cushion 19 is used for integral heating. The heating function of the heating cushion 19 may also be realized by means of heating wires 23 sinuously arranged on the base material of the heating cushion 19, wherein the power density of the heating area 21 is higher than the power density of the heating cushion 19.

Working principle is as follows. The airbag group 1211 is disposed corresponding to the heating area 21, and the airbag group 1211 and the heating area 21 are independently controlled. When the driving device 8 controls the airbag group 1211 to inflate, the first airbag body 3 can drive the heating area 21 of the heating cushion layer 2 to jack. At the same time, the islanding heating unit 7 which is corresponding to the position of the first airbag body 3 that should be inflated is heated, and then the system works at the position where the man body is in the first airbag body 3 and manifests as the hot jacking action, so as to achieve the role that as if it is the hot moxibustion effect.

As the first airbag body 3 inflates and jacks the heating cushion 2, the second suspension area 62 is formed between the peripheral side of the first airbag body 3, the heating cushion layer 2 and the seat body 13. Under a synergistic cooperation of the islanding heating unit 7, the driving device 8 and the heat dissipation system, the heat dissipation system can discharge the heat from the heating cushion layer 2 corresponding to the position of the second suspension area 62. The solution expands the temperature difference between the hot moxibustion area and the adjacent area, which highlights the effect of the local hot jacking area, and meets the requirement that the hot sensation of the temperature difference of the hot moxibustion area is more prominent relative to the peripheral area, which solves the problem that under the cyclic working state, the heat accumulation will affect man body to perceive the massage heating temperature.

It should be noted that the heating power of the hot jacking action area is larger, and the heat produced by the hot jacking area is larger than the heat taken away by the heat dissipation system. The hot jacking area is provided with a heating mechanism (e.g., the heating wire 23), and the heating mechanism (e.g., the heating wire 23) continues to produce the heat during the hot jacking period. When the peripheral area has no heating mechanism or when the heating mechanism does not work, the hot jacking area can still transfer the heat towards the peripheral area. Therefore, the riders still feel the local hot jacking function on the hot jacking action area, and the heat of the other area is taken away by the heat dissipation system, so that the temperature of the hot jacking action area is significantly larger than the peripheral area.

In some embodiments, when the first airbag body 3 is in the inflatable state, and the islanding heating unit 7 corresponding to the first airbag body 3 is in the heating state, the first airbag body 3 drives the heating area 21 to protrude outwardly, thereby forming the hot jacking structure 5 in contact with the man body. The first suspension area 61 is formed between the peripheral side of the hot jacking structure 5, the heating cushion layer 2 and the man body. The first suspension area 61 is connected with the second suspension area 62, so when the heat dissipation system 130 is in operation, the heat dissipation system 130 can discharge the heat of the position corresponding to the first suspension area 61 along with the air flow from the heating and heat-dissipation synergistic thermal control device 100.

Specifically, the heat of the position corresponding to the first suspension area 61 is that, the heat of the first suspension area 61 that is formed between the man body and the heating cushion layer 2, and the heat of the position of the first suspension area 61 corresponding to the heating cushion layer 2. Since the heat dissipation system 130 can also discharge the heat of position of the heating system 110 corresponding to the second suspension area 62 foregoing, and the heat of the chair surface position of the seat body 13 through the air channel structure 131, the solution highlights the effect of the local hot jacking, and meets the requirement that the hot sensation of the temperature difference of the hot moxibustion area is more prominent relative to the peripheral area. Specifically, through driving the first airbag body 3 to inflate and jack, the first airbag body 3 drives the corresponding heating area 21 to jack. At the same time, the corresponding islanding heating unit 7 is independently controlled to work and heat, thereby forming a local spotted hot jacking structure 5. The hot jacking structure 5 abuts against and jacks up the man body to realize the action of heating and jacking. The first airbag bodies 3 of the remaining positions is in a flat state, and the heating areas 21 of the remaining position are in a stopped heating state. Under the action of the hot jacking structure 5, the local part of the man body is jacked up, and between the peripheral side of the hot jacking structure 5, the man body and the heating cushion layer 2, the first suspension area 61 is formed. Since the hot jacking structure 5 is tightly contacted with the man body by jacking, and the air channel structure 131 is relatively closed, the heat of this region will not spill and run away due to the influence of the heat dissipation action. For the position of the peripheral side of the hot jacking structure 5, since the first suspension area 61 is communicated with the second suspension area 62, the air channel structure 131 opens, which provides the channel for the air flowing.

Therefore, the air in the heating cushion layer 2, the first suspension area 61 and the second suspension area 62 can be flowed when the heat dissipation system 130 is in operation, and discharged accompanying with the heat of the corresponding position, which highlights the effect of the local hot jacking.

In some embodiments, one side of the heating cushion layer 2 adjacent to man body is provided with the breathable layer 4. The air breathability of the region on the breathable layer 4 corresponding to the hot jacking structure 5 is smaller than the air permeability of the adjacent areas. When the heat dissipation system 130 is in operation, the heat dissipation system 130 may discharge the heat of the positions of the first suspension area 61 and the second suspension area 62 corresponding to the breathable layer 4 along with the air flow from the heating and heat-dissipation synergistic thermal control device 100. It improves the air permeability of the periphery of the hot jacking structure 5. The air is prioritized to flow from the periphery of the hot jacking structure 5, so as to prioritize to ensure the heat of the periphery of the hot jacking structure 5 is taken away, and to reduce the heat loss of the region of the hot jacking structure 5.

Figure 16:
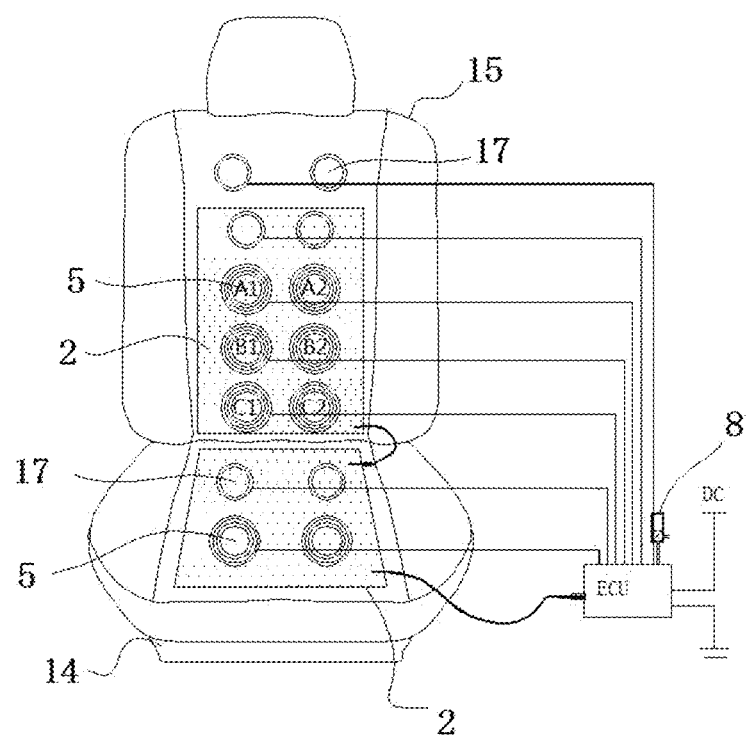
FIG. 16 shows a first-view structure schematic diagram of the heating and heat-dissipation synergistic thermal control device shown in FIG. 1.
Figure 17:
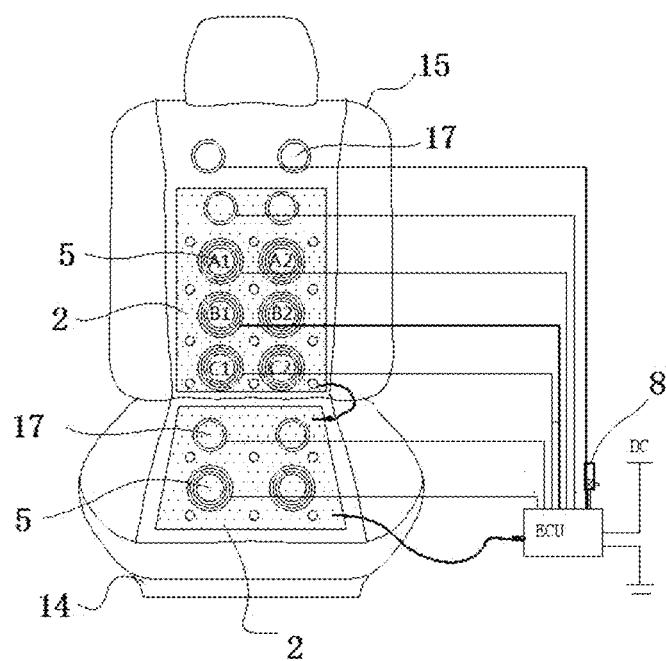
FIG. 17 shows a structure schematic diagram of the air permeability of the heating pat body layer close to the hot jacking structure being greater than the air permeability of other areas shown in FIG. 16.
Figure 25:
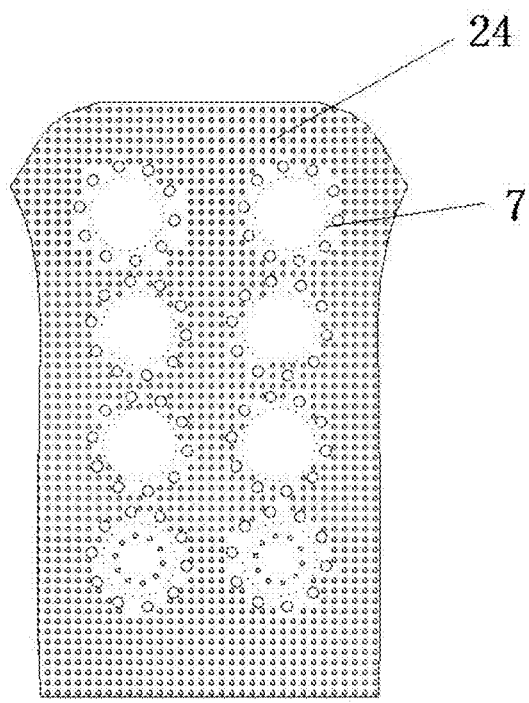
FIG. 25 shows a structure schematic diagram that the holes are disposed on the heating cushion layer corresponding to hot jacking structure according to shown in FIG. 1.

Specifically, as shown in FIG. 16 and FIG. 17, the air permeability of the heating cushion layer 2 corresponding to the area of the hot jacking structure 5, and the air permeability of the adjacent areas may be achieved by setting the size of the open pores and/or the number of the open pores. Specifically, the breathable base material 24 of the heating cushion 2 corresponding to the area of the hot jacking structure 5 may be disposed with the holes as shown in FIG. 25, so as to make the peripheral air flow channel of the hot jacking area smoother. The position of the region of the hot jacking structure 5 corresponding to the breathable base material 24 may be disposed with the holes, or it may not be disposed with the holes.

Figure 11:
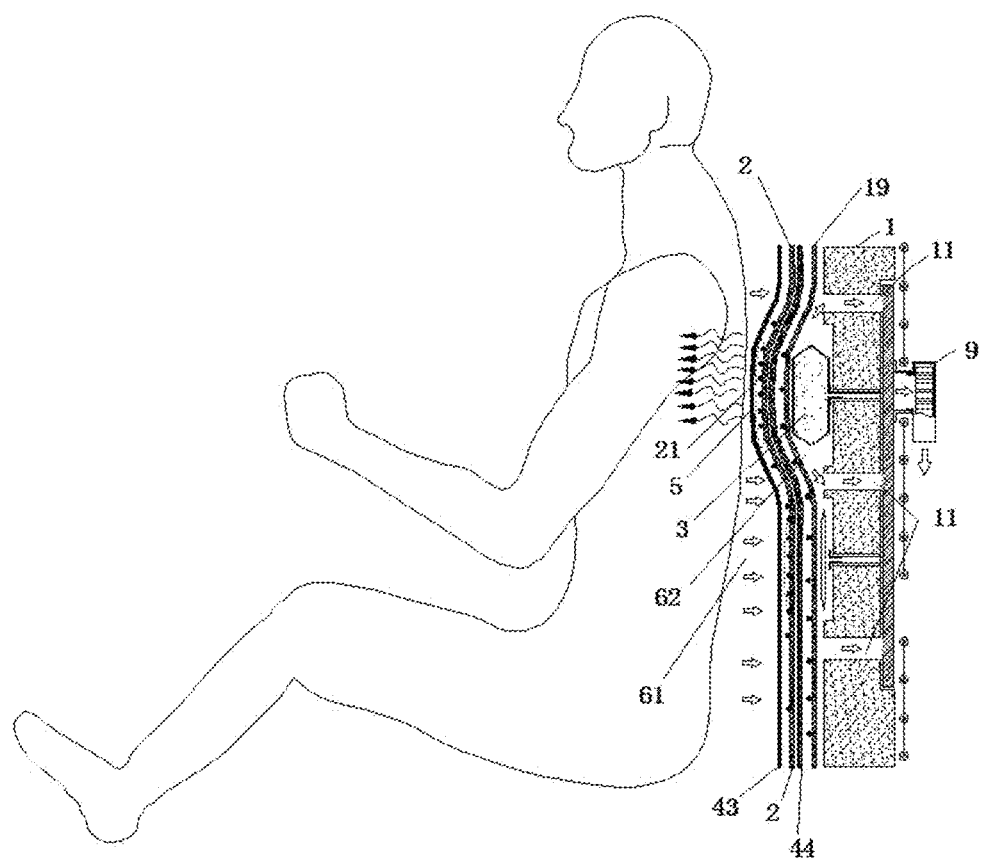
FIG. 11 shows a structure schematic diagram of the heating and heat-dissipation synergistic thermal control device being used shown in FIG. 9.
Figure 12:
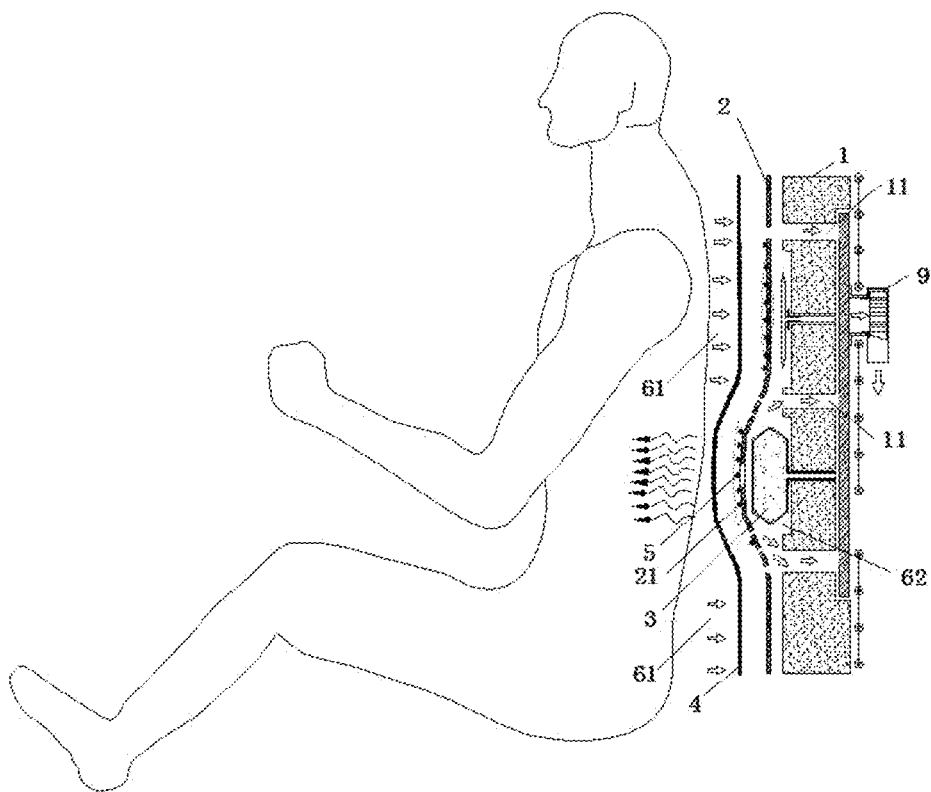
FIG. 12 shows a structure schematic diagram of the heating and heat-dissipation synergistic thermal control device being used shown in FIG. 10.

It should be noted that, as shown in FIG. 11 and FIG. 12, when the hot jacking structure 5 is tightly contacted with the man body by jacking, the region of the breathable layer 4 corresponding to the hot jacking structure 5 is blocked. The heat in this area still will not spill and run away due to the effect of the heat dissipation action, and the heat in the first suspension area 61 can be discharged through the breathable structure on the breathable layer 4 and via the heat dissipation system 130.

Specifically, when the heat dissipation driving device 9, such as the rotor fan 91, works, on the one hand, the rotor fan 91 accelerates the air flow of the breathable layer 4, the heating cushion layer 2, the first suspension area 61 and the second suspension area 62, which accelerates the air flow to take away the heat from the periphery of the hot jacking structure 5. On the other hand, the hot jacking structure 5 acts on the man body and is tightly contacted with the man body, and the region space of the hot jacking structure 5 corresponding to the breathable layer 4 is blocked, which is unfavorable for the air flow and favorable to the heat cohesion. Therefore, the heat in this area can lead to the distinct temperature difference because of the hot jacking area and the peripheral area, and the riders can distinctly feel the hot jacking action.

Specifically, the air permeability of the hot jacking structure 5 is smaller than 20% or more of the air permeability of the adjacent area. Specifically, the breathable layer 4 is the surface layer 43 of the surface cover, which is configured to be breathable. The surface cover further includes the lining layer 44, the lining layer 44 is disposed between the heating cushion 2 and the airbag layer 121, and the surface cover can be select as a fabric. The surface layer is thinner, so it facilitates the heat transfer, and improves the speed of the man body feeling the temperature rise. Specifically, the lining layer 44 has the air permeability and can be compressed under force, such as a sponge layer or an interval fabric layer. When the first airbag body 3 jacks up, the local part of the lining layer 44 is compressed and becomes dense, which is not favorable to the air flow, and the local temperature retention feature is better. The air of the other areas of the lining layer 44 can flow relatively, so as to discharge the heat from the first suspension area 61 and the second suspension area 62.

In addition, the breathable layer 4 may also be the overall surface cover, that is, the surface layer 43 and the lining layer 44 are disposed at the side of the heating cushion layer 2 away from the airbag layer 121. When the first airbag body 3 jacks, the breathable structure of the position of the hot jacking structure 5 in contact with the man body is blocked, and meanwhile, the thickness of the surface cover is compressed, and the channel of air flow is blocked. Therefore, the heat in this area can still be gathered, and the heat in the other areas (i.e., the first suspension area 61, the second suspension area 62) is preferentially discharged through the heat dissipation system.

In some embodiments, each of the airbag groups 1211 and the corresponding islanding heating unit 7 are a group of synergy unit 122; the set control strategy includes: the control synergy unit 122 switches between the first state and the second state in response to the external start signal; during the first state, the islanding heating unit 7 is turned on, and the driving device 8 switches the first airbag body 3 to the inflatable state; and during the second state, the islanding heating unit 7 is turned off, and the driving device 8 switches the first airbag body 3 to the deflated state. Specifically, the driving device 8 may control different airbag groups 1211 to work independently.

Working principle is as follows. During the first state, the first airbag body 3 of the first airbag group 1211 is inflated and jacks up, and at the same time, the islanding heating unit 7 corresponding to the position thereof is turned on to heat, in which the user can feel the effect that the heating and the press are as if the hot moxibustion. During the second state, the first airbag body 3 of the first airbag group 1211 deflates and restores, and at the same time, the islanding heating unit 7 corresponding to the position is turned off, such that the press and the heating disappears, and the man body feels the temperature of the area is reduced. Since the driving device 8, the islanding heating unit 7, and the heat dissipation system 130 synergistically cooperate, during the process of switching between the first state and the second state repeatedly, the user can obviously feel the effect of the local hot jacking corresponding to the position of the inflated first airbag body 3, which solves the problem of heat accumulation of the chair surface in the cyclic working state.

In some embodiments, the method of controlling the synergy unit 122 to switch between the first state and the second state is specified as follows:

s1: sequentially controlling one or multiple synergy units 122 to switch between the first state and the second state, until all of the synergy units 122 have completed the switching of the first state and the second state; and s2: repeating step s1 until the control system 140 stops, in response to the external stop signal or satisfying the set condition.

Figure 10:
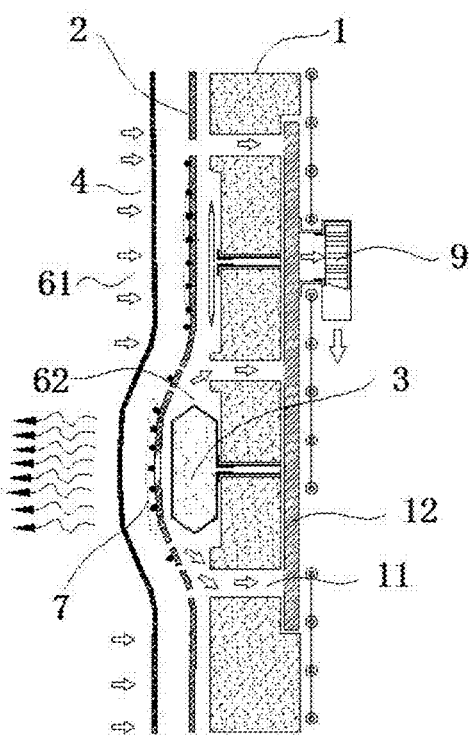
FIG. 10 shows a structure schematic diagram of the first airbag body jacking at the bottom shown in FIG. 1.

Specifically, the set condition can be stopping when the repeated times of step s1 reach the set value or when the duration reaches the set value. Specifically, controlling the following steps can be set according to the actual requirements: the switching times between the first state and the second state of each synergy unit 122, the switching intervals for each switching, and the switching orders of each synergy unit 122. For easy illustration of the working principle of the embodiment, taking a1, a2, b1, b2, c1, c2, i.e., six first airbag bodies 3 in total, as an example, a1 and a2 are the same airbag group 1211, b1 and b2 are the same airbag group 1211, c1 and c2 are the same airbag group 1211, and the three airbag groups 1211 are independently controlled for inflation and deflation. The corresponding hot jacking structures 5 are the six areas of A1, A2, B1, B2, C1 and C2 as shown in FIG. 16, and so the working principle is as follows:

s11: controlling the synergy unit 122 corresponding to the two first airbag bodies 3 of a1, a2 to switch to the first state, and after duration of T, controlling the synergy unit 122 to switch to the second state; and stopping after repeating n times, wherein the inflatable state of two first airbag bodies 3 of a1, a2 is as shown in FIG. 9 and FIG. 11;

s12: controlling the synergy unit 122 corresponding to the two first airbag bodies 3 of b1, b2 to switch to the first state, and after duration of T, controlling the synergy unit 122 to switch to the second state; and stopping after repeating n times, wherein the inflatable state of two first airbag bodies 3 of b1, b2 is shown in FIG. 10 and FIG. 12;

s13: controlling the synergy unit 122 corresponding to the two first airbag bodies 3 of c1, c2 to switch to the first state, and after duration of T, controlling the synergy unit 122 to switch to the second state; and stopping after repeating n times; and s21: repeating steps s11-s13 until the control system 140 stops, in response to the external stop signal or satisfying the set condition.

It should be noted that the above embodiments are easy standing for to those skilled in the art, and are not intended to limit the switching times, the switching intervals or the switching orders. For example, in another embodiment, one synergy unit 122 can be controlled to switch actions at a time, and the switching orders of the plurality of synergy units 122 adopt a wave order, a reverse order, or a random order, etc. In another embodiment, all the synergy units 122 can also be controlled to switch actions at a time. For example, s11 is turned on, and then s12 is turned on after a certain interval period, and s13 is turned on after a certain period of turning on s12, and the setting of the interval period is to ensure that, one and only one group of the airbag group 1211 reaches the highest inflatable state at each time point, and only one group of the hot jacking structure 5 acts on the man body at one time point.

In an optional embodiment, the control system 140 is further configured to: when the last synergy unit 122 is controlled to switch from the first state to the second state, control the islanding heating unit 7 of the next synergy unit 122 to preheat, so as to shorten the duration of the islanding heating unit 7 reaching a saturation temperature.

In an optional embodiment, the different first airbag bodies 3 in the same synergy unit 122 can be independently controlled to inflate and deflate. For example, as shown in FIG. 16, the same synergy unit 122 contains the region A1 and the region A2, and the islanding heating units 7 corresponding to the region A1 and the region A2 belong to the same heating area 21, which separately corresponds to the first airbag body 3 labeled as a1, and the first airbag body 3 labeled as a2. The first airbag body 3 labeled as a1 and the first airbag body 3 labeled as a2 can be independently controlled to inflate and deflate, which can be realized that the two islanding heating units 7 corresponding to A1 and A2 in the same synergy unit 122 simultaneously are turned on or stop heating. The heat dissipation system 130 can be turned on simultaneously or after delayed for a certain period during the whole heating period, and the at can also be controlled to deflate after the a1 inflates and jacks up or jacks up for a certain period. After a1 is deflated or deflated for a certain period, and after a2 inflates and jacks up or jacks up for a certain period, a2 deflates. After a2 starts to deflate or is deflated for a certain period, the islanding heating units 7 corresponding to the region A1 and the region A2 stops heating. When the heat dissipation system 130 is turned on to work, although both of the islanding heating units 7 corresponding to A1, A2 in the same synergy unit 122 heat simultaneously, a2 falls back while a1 inflates and jacks up, so that the hot jacking structure formed in the region A1 acts on the man body. While the region A2 is affected by the heat dissipation system 130 and the first suspension area 61 and/or the second suspension area 62, and partial heat in the region A2 is taken away by the heat dissipation system 130, and thus the temperature in the region A2 is lower than the temperature in the region A1, which still ensures the sense of temperature difference between the region A1 and the region A2. Similarly, because the heat dissipation system 130 is turned on to work, although the two isolating heating units 7 corresponding to A1 and A2 in the same synergy unit 122 are heated simultaneously, when a2 inflates and jacks up, a1 falls back, so that the hot jacking structure formed in the region A2 acts on the man body. While the region A1 is affected by the heat dissipation system 130 and the first suspension area 61 and/or the second suspension area 62, and partial heat in the region A1 is taken away by the heat dissipation system 130, and thus the temperature in the region A1 is lower than the temperature in the region A2, which still ensures the sense of temperature difference between the region A1 and the region A2. The synergy unit 122 is not limited to correspond to the two regions A1, A2, the two islanding heating units 7 and the two first airbag bodies 3. The synergy unit 122 may correspond to more than two isolating heating units 7 in one heating area 21, and more than two first airbag bodies 3. When the number is multiple, the heat dissipation system 130 can be turned on according to that the islanding heating units 7 in the heating area 21 are heated simultaneously, and then the different first airbag bodies 3 are controlled to inflate and deflate independently according to a certain order.

In some embodiments, the set control strategy further includes:
controlling the heat dissipation system 130 to be turned on after determining that the step s1 has been carried out m times, wherein m≥1; or, controlling the heat dissipation system 130 to be turned on after t1 duration of the initial control moment; and the initial control moment is the start moment in response to the external start signal, wherein t1 is the set value and t1≥0.

In some embodiments, the set control strategy further includes: controlling the heat dissipation system 130 to be turned off after t2 duration of the terminal control moment; and the terminal control moment is the stopping moment of the step s2, wherein t2 is the set value and t2≥0. It should be noted that, during the cooperative operation process of the heating system 110, the pneumatic massage system 120 and the heat dissipation system 130, the heat dissipation system 130 can work all the time, or can work or stop according to a set frequency.

Specifically, the heat dissipation driving device 9 of the heat dissipation system 130, for example, the rotor fan 91 may be turned on at the same time as the synergy unit 122 being turned on, or it may fall behind for a period, which ensures that the heat of the synergy unit 122 at the region outside of the hot jacking area is taken away and discharged timely. The specified solution of the heat being taken away has illustrated in the embodiments foregoing, and is not repeated herein. It should be noted that the heat dissipation system 130 may also connect to other control units, and the control mode can be optionally set by setting the priority. For example, the heat dissipation system 130 can be controlled to turn on/off, through setting the second control unit and configuring the second control unit to respond to the ventilation on/off signal, thereby adapting the chair ventilation requirement in summer or other scenes.

In some embodiments, the heating and heat-dissipation synergistic thermal control device 100 further includes the sensor unit 150, wherein the sensor unit 150 includes the first temperature sensor 151, the second temperature sensor 152 and the third temperature sensor 153. The first temperature sensor 151 is configured to measure the temperature of the heating area 21; the second temperature sensor 152 is configured to measure the temperature of the reference area 22, and the reference area 22 is located between two of the adjacent heating areas 21; and the third temperature sensor 153 is configured to measure the temperature of the breathable layer 4. The control system 140 is further configured for: controlling the heat dissipation system to be turned on, when determining that the temperature of the heating area 21 is larger than or equal to the temperature of the reference area 22 by i° C., wherein i is the set value and i≥0; and
controlling the heat dissipation system 130 to be turned off, when determining that the temperature of the reference area 22 is ≤j° C.

The second temperature sensor 140 and the third temperature sensor 150 may be mounted on the surface of the reference area 22 and the breathable layer 4 respectively, so as to measure the surface temperature.

Specifically, i is the set value, such as i=3. Specifically, j is the set value, such as j=36.

Specifically, the values of i and j may be numerically adjusted based on requirements, and are not limited to 3 or 36.

Specifically, when the synergy unit 122 is in operation, it may also control the heat dissipation system 130 to be turned on when determining that the temperature of the reference area 22 is larger than or equal to a certain set value.

Specifically, after the synergy unit 122 is operated for 1 or several cycles, and the difference of the temperature value between the heating area being heated and the reference area is smaller or equal to a certain set value, the heat dissipation system 130 is controlled to be turned on.

Figure 26:
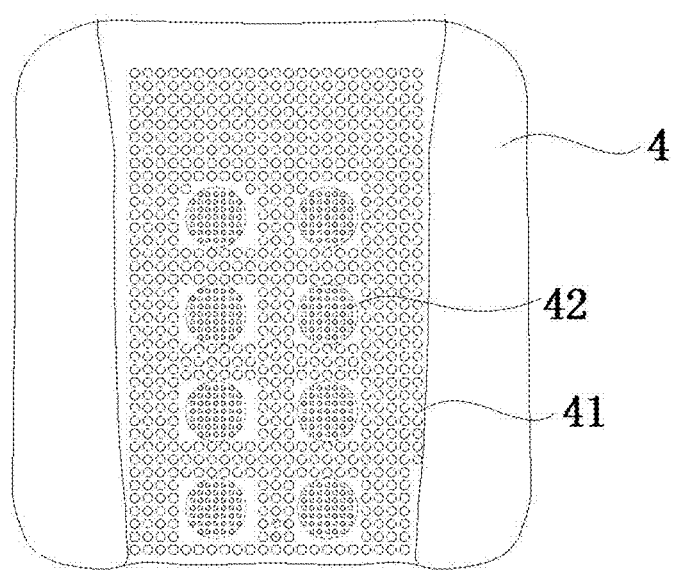
FIG. 26 shows a structure schematic diagram of the breathable layer shown in FIG. 1.

Specifically, it may also control the heat dissipation system 130 to be turned off when determining the temperature of the breathable layer 4≤j° C. In some embodiments, as shown in FIG. 26, the position on the breathable layer 4 and corresponding to the hot jacking structure 5 has the air hole 42, and the outer peripheral side of the position on the breathable layer 4 and corresponding to the hot jacking structure 5 is disposed with several vent holes 41; and the air permeability of the position of the breathable layer 4 corresponding to the hot jacking structure 5 is smaller than the air permeability of the region position of the outer peripheral side of the hot jacking structure 5. Specifically, the air permeability may be realized by setting the number or setting the aperture, that is, the aperture of the air hole 42 is smaller than the aperture of the vent hole 41, and/or the number of the air hole 42 is smaller than the number of the vent hole 41 at the surrounding region.

Optionally, the open pore area of all the air holes 42 is smaller than 20% of the open pore area of all the vent holes 41. In some embodiments, the second airbag body 18 is disposed between the pat body layer 1 and the breathable layer 4, and the orthogonal projection of the second airbag body 18 on the breathable layer 4 is separate from the orthogonal projection of the heating area 21 on the breathable layer 4.

Specifically, when the second airbag body 18 is in the inflatable state, the second airbag body 18 drives the corresponding area of the breathable layer 4 to protrude outwardly, forming the massage structure 17. The users can select the heating massage or the ordinary massage by setting the second airbag body 18. Moreover, through the setting of the controller, the heating components can be controlled to not heat, the first airbag body operates according to the certain order, and the ordinary massage function can also be realized. Specifically, the first airbag body 3 and the second airbag body 18 may share the driving device 8; or, the second airbag body 18 is disposed with an independent driving device to control the second airbag body 18 to switch the inflatable state and deflated state.

In some embodiments, the seat body 13 is disposed with the pat body layer 1; the heating cushion layer 2 is mounted on the side of the pat body layer 1 away from the seat body 13; and the air channel structure 131 includes the air circulation hole 11 disposed on the pat body layer 1.

Specifically, the input end of the heat dissipation driving device 9 is communicated with the second suspension area 62 through the air circulation hole 11, which is configured to export the heat from the second suspension area 62 through the output end of the heat dissipation unit. The function of the heat dissipation driving device 9 is to drive the air flow. The position where the air enters to the heat dissipation drive 9 is the input end of the heat dissipation drive 9, and the position where the air exports from the heat dissipation drive 9 is the output end of the heat dissipation drive 9. The output end of the heat dissipation driving device 9 may refer to the air outlet of the rotor fan 91, and the input end of the heat dissipation driving device 9 may refer to the air inlet of the rotor fan 91. It is known that since the pat body layer 1 is disposed with the seat body 13, the second suspension area 62 is formed between the peripheral side of the first airbag body 3 and the pat body layer 1 and the heating cushion layer 2.

Optionally, the air channel structure 131 includes the wind guide structure 1311 disposed between the side of the heating cushion layer 2 near the seat body 13 and the heat dissipation system 130. The wind guide structure 1311 may be disposed in any one of the following ways.

1. The wind guide structure 1311 includes the air guide layer 10 disposed on the side of the pat body layer 1 near the heating cushion layer 2, and also includes the air circulation hole 11. Optionally, the air guide layer 10 is disposed between the heating cushion layer 2 and the airbag layer 121, and the air guide layer 10 is preferably selected as a three-dimensional knitted net fabric.

Figure 18:
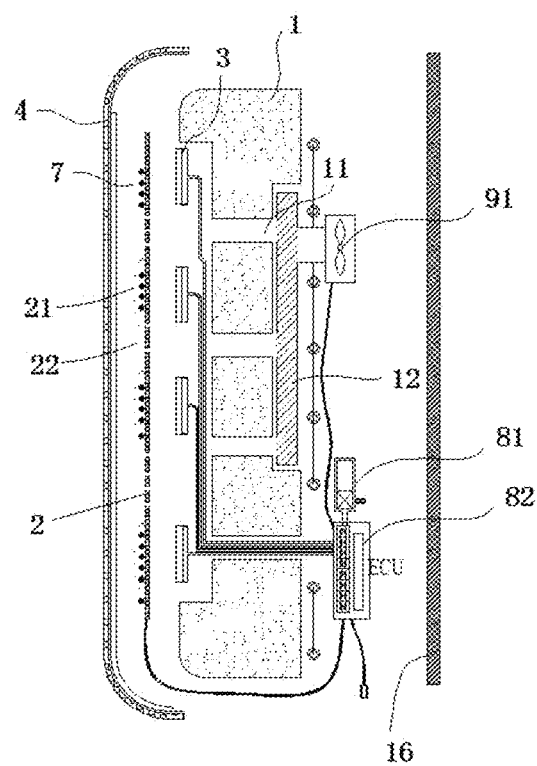
FIG. 18 shows a structure schematic diagram without the air guide layer between the heating cushion layer and the airbag layer shown in FIG. 1.

2. As shown in FIG. 18, the wind guide structure 1311 includes the first wind guide bag 12 disposed on the side of the pat body layer 1 away from the heating cushion layer 2. The heat of the first suspension area 61 and the second suspension area 62 passes through the air circulation hole 11 and the first wind guide bag 12 in sequence, and is ultimately exported from the heat dissipation driving device 9.

3. As shown in FIG. 1, the wind guide structure 1311 has both the air guide layer 10 as described above, and the first wind guide bag 12.

Specifically, the air guide layer 10 and the first wind guide bag 12 are one or multiple of a ventilation capsule body, and a channelized type and a fire resistant three-dimensional knitted net fabric. In some embodiments, the seat body is disposed with the pat body layer 1, and the input end of the heat dissipation driving device 9 passes through the pat body layer 1 and is communicated with the first suspension area 61 and the second suspension area 62.

Figure 19:
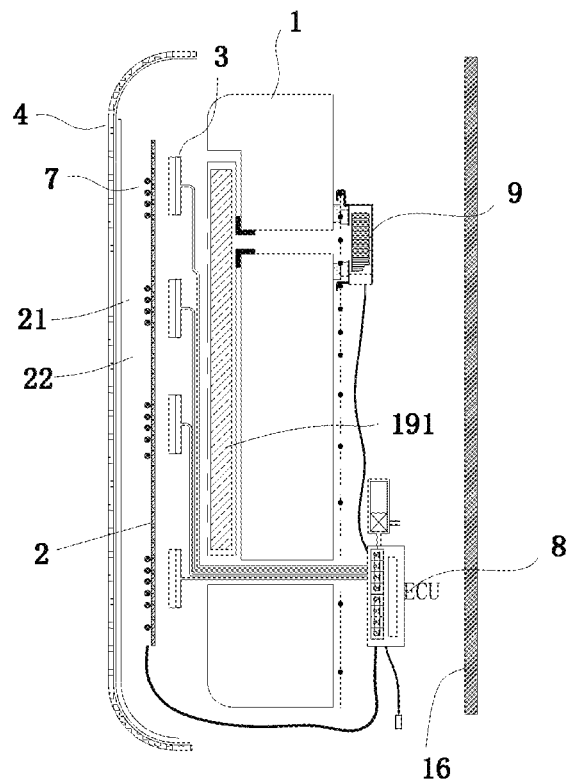
FIG. 19 shows a structure schematic diagram that the second wind guide bag is disposed on one side of the pat body layer close to the heating cushion layer shown in FIG. 1.

Based on the structure, as shown in FIG. 19, the second wind guide bag 191 may be disposed on the side of the pat body layer 1 near the heating cushion layer 2, so that the heat of the first suspension area 61 and the second suspension area 62 passes through the input end of the heat dissipation driving device 9 of the second wind guide bag 191 sequentially, and is ultimately exported by the output end of the heat dissipation driving device 9.

Figure 24:
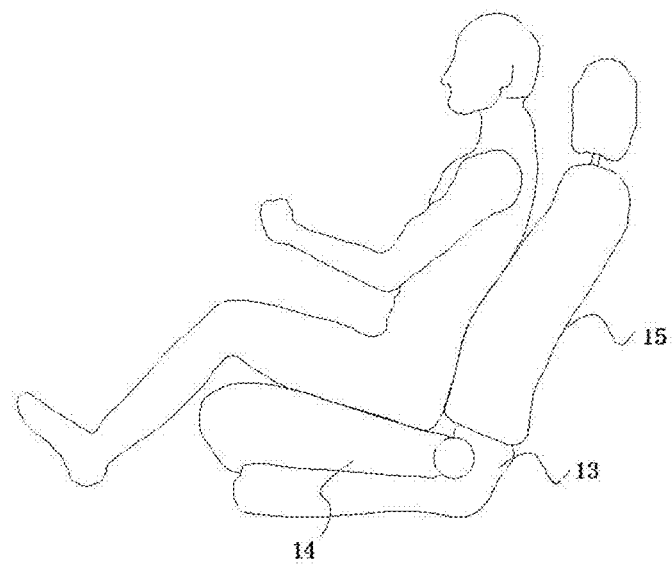
FIG. 24 shows a schematic diagram of the automobile seat provided in the embodiment.

The embodiment provides the automobile seat, as shown in FIG. 24, including the seat body 13, wherein the seat body 13 has the seat cushion 14 and a back 15, the seat cushion 14 and/or the back 15 are/is mounted with the heating and heat-dissipation synergistic thermal control device 100 as described above. Specifically, the cover plate 16 is mounted on the side of the pat body layer 1 away from the heating cushion layer 2, and the cover plate 16 is configured to be connected with the seat body 13.

Figure 20:
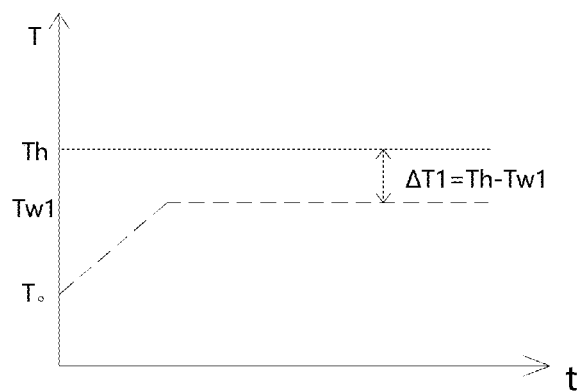
FIG. 20 shows a temperature-difference schematic diagram between the hot moxibustion area and the surrounding area of the related technical.
Figure 21:
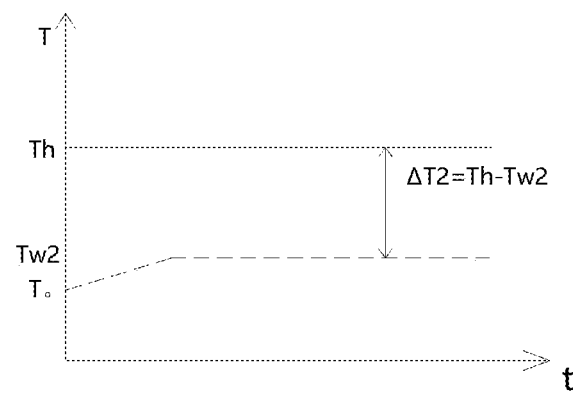
FIG. 21 shows a temperature-difference schematic diagram between the hot jacking area and the surrounding area in the embodiment.

In order to illustrate beneficial effects of the present embodiment, the present embodiment separately lists the temperature difference schematic diagram of the hot moxibustion area in prior art and the surrounding as shown in FIG. 20, and the temperature difference schematic diagram of the hot jacking area in the embodiment and the surrounding as shown in FIG. 21. T0 denotes the initial temperature of the seat, Th denotes the temperature value of the hot jacking area, Tw1 denotes the surrounding temperature of the hot moxibustion area in the prior art, and Tw2 denotes the surrounding temperature of the hot jacking area of the present disclosure, ΔT1 denotes the temperature difference between the hot moxibustion area and the surrounding area in the prior art; and ΔT2 denotes the temperature difference between the hot jacking area and the surrounding area in the present embodiment.

As can be seen in FIG. 20 and FIG. 21, the heating and heat-dissipation synergistic thermal control device 100 provided in the embodiment goes through several cycles or operates a period of time, and the temperature values of the hot jacking area and the surrounding region tends to be stable. At this time, the temperature value Th of the hot jacking area is obviously larger than the temperature value of the surrounding region Tw2. The heating and heat-dissipation synergistic thermal control device 100 provided in the embodiment is used, which makes Tw2 tend to be T0, and makes the temperature difference ΔT2 of the hot jacking area and the surrounding area obviously larger than ΔT1, and meet the requirement that the hot sensation of the temperature difference of the hot jacking area is prominent relatively to the peripheral area.

Figure 22:
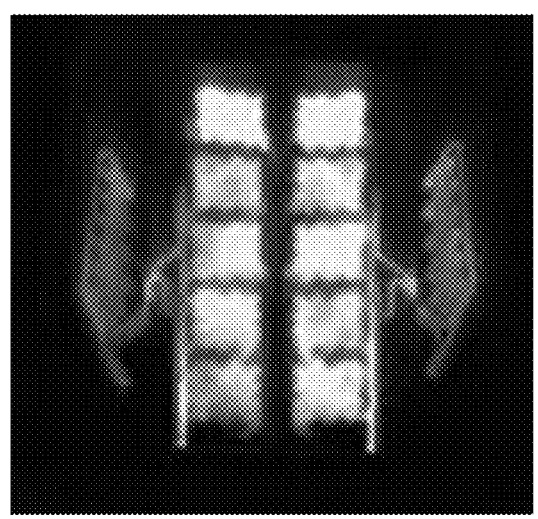
FIG. 22 shows a schematic diagram that the chair surface is in a hot state in the related technical.
Figure 23:
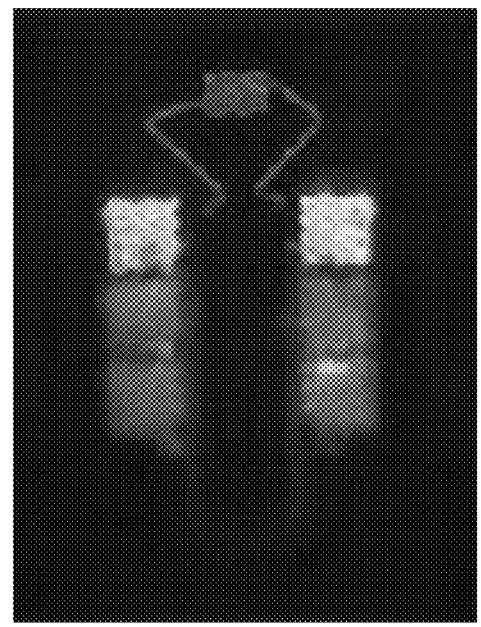
FIG. 23 shows a schematic diagram that the chair surface is in a hot state in the embodiment.

As shown in FIG. 22, which is the schematic diagram of the prior art that the chair surface is in the hot state, the highlighted area in the diagram presents the heating state, and the whole chair surface is in the hot state, which cannot exert the comfort sensation of the local hot jacking. Other areas are similar in the heating state where the riders do not have the heating requirement, which is easy to cause the complaints from the riders. As shown in FIG. 23, which is the schematic diagram of the chair surface being in the hot state of the embodiment, it can be seen from the diagram that only the heating area is in the heating state, and the other areas are at lower temperatures, which highlights the effect of the local hot jacking, and meets the requirement that the hot sensation of the temperature difference of the hot jacking area is prominent relatively to the peripheral area.

The above description is only a preferred embodiment of the present embodiments, and the illustration for the technical principles utilized. It should be understood by those skilled in the art that the scope involved in the embodiment, is not limited to the technical solutions that formed by the specific combination of the above technical features, but should also cover other technical solutions formed by any combinations of the above technical features or the equivalent features without departing from the inventive concept, for example, a technical solution formed by the features described above being mutually substituted with technical features with the similar functions disclosed in the embodiment (but it is not limited thereto).

INDUSTRIAL APPLICABILITY

In summary, the embodiment provides a heating and heat-dissipation synergistic thermal control device and automobile seat, which expands the temperature difference between the hot moxibustion area and the adjacent area, highlights the effect of local hot jacking, and meets the requirement that the hot sensation of the temperature difference of the hot moxibustion area is more prominent relative to the peripheral area, thereby solving the problem that under the cyclic working state, the heat accumulation will affect man body to perceive the massage heating temperature.

What is claimed is:

1. A heating and heat-dissipation synergistic thermal control device, comprising:
    a heating system, wherein the heating system comprises a heating cushion layer configured to be mounted on a seat body, the heating cushion layer has a breathable base material and several independently controlled heating areas arrayed and arranged on the breathable base material, and each of the heating areas is disposed with at least one islanding heating unit;
    a pneumatic massage system, wherein the pneumatic massage system comprises an airbag layer arranged on one side of the heating cushion layer near the seat body, the airbag layer has airbag groups disposed at positions corresponding to each of the heating areas, each of the airbag groups is independently controlled and has at least one first airbag body disposed corresponding to the islanding heating unit, the first airbag body is connected with a driving device, and the driving device is configured to switch between an inflatable state and a deflated state of the first airbag body; and
    when the first airbag body is in the inflatable state, a second suspension area is formed between peripheral sides of the first airbag body and the heating cushion layer and the seat body;
    a heat dissipation system, wherein the heat dissipation system comprises a heat dissipation driving device and an air channel structure, the air channel structure is communicated with the breathable base material, the second suspension area and the heat dissipation driving device, and when the heat dissipation driving device is operated, air flows from the air channel structure towards the heat dissipation driving device; and
    a control system, wherein the control system is configured to control the heating system, the pneumatic massage system and the heat dissipation system to operate synergistically with a set control strategy; the set control strategy comprises that, at least during a setting time, the heating system, the pneumatic massage system and the heat dissipation system operate simultaneously, and during the setting time, the heat dissipation system discharges partial heat at a position of the second suspension area corresponding to the heating system with an air flow from the heating and heat-dissipation synergistic thermal control device.

2. The heating and heat-dissipation synergistic thermal control device according to claim 1, wherein when the first airbag body is in the inflatable state and a corresponding islanding heating unit of the first airbag body is in a heating state, and the first airbag body drives the heating area to protrude outwardly, so as to form a hot jacking structure contacted with a man body; a first suspension area is formed between a peripheral side of the hot jacking structure and the heating cushion layer and the man body; and the first suspension area is communicated with the second suspension area, so that when the heat dissipation system is operating, the heat dissipation system discharges a heat at a position corresponding to the first suspension area along with an air flow from the heating and heat-dissipation synergistic thermal control device.

3. The heating and heat-dissipation synergistic thermal control device according to claim 2, wherein one side of the heating cushion layer near the man body is mounted with an breathable layer; an air breathability of a region on the breathable layer corresponding to the hot jacking structure is smaller than an air permeability of adjacent areas; and when the heat dissipation system is operated, the heat dissipation system can discharge a heat at positions of the first suspension area and the second suspension area corresponding to the breathable layer along with an air flow from the heating and heat-dissipation synergistic thermal control device.

4. The heating and heat-dissipation synergistic thermal control device according to claim 1, each of the airbag groups with a corresponding islanding heating unit is a group of synergy unit, wherein the set control strategy comprises: controlling the synergy unit to switch between a first state and a second state in response to an external start signal, wherein
    when in the first state, the islanding heating unit is turned on, and the driving device switches the first airbag body to the inflatable state;
    when in the second state, the islanding heating unit is turned off, and the driving device switches the first airbag body to the deflated state.

5. The heating and heat-dissipation synergistic thermal control device according to claim 4, wherein a method of controlling the synergy unit to switch between the first state and the second state is as follows:
    s1: sequentially controlling one or more synergy units to switch between the first state and the second state, until all synergy units complete switching of the first state and the second state; and
    s2: repeating step s1, until the control system stops in response to an external stop signal or meeting a set condition.

6. The heating and heat-dissipation synergistic thermal control device according to claim 5, wherein the set control strategy further comprises:

controlling the heat dissipation system to be turned on after determining that the step s1 has been carried out m times, wherein m≥1; or controlling the heat dissipation system to be turned on after t1 duration of an initial control moment; and the initial control moment is a start moment in response to the external start signal, wherein t1 is a set value and t1≥0.

7. The heating and heat-dissipation synergistic thermal control device according to claim 6, wherein the set control strategy further comprises: controlling the heat dissipation system to be turned off after t2 duration of a terminal control moment; and the terminal control moment is a stopping moment of the step s2, wherein t2 is a set value and t2≥0.

8. The heating and heat-dissipation synergistic thermal control device according to claim 3, the heating and heat-dissipation synergistic thermal control device further comprises a sensor unit, wherein the sensor unit comprises a first temperature sensor, a second temperature sensor and a third temperature sensor;

the first temperature sensor is configured to measure a temperature of the heating areas; the second temperature sensor is configured to measure a temperature of a reference area, and the reference area is located between two adjacent heating areas;

the third temperature sensor is configured to measure a temperature of the breathable layer;

the control system is further configured for: controlling the heat dissipation system to be turned on, when determining that the temperature of the heating areas is greater than or equal to the temperature of the reference area by i° C., wherein i is a set value and i≥0; and controlling the heat dissipation system to be turned off when determining that the temperature of the reference area is ≤j° C.

9. The heating and heat-dissipation synergistic thermal control device according to claim 3, wherein a position on the breathable layer and corresponding to the hot jacking structure has air holes, and a position on the breathable layer and located at an outer peripheral side of the hot jacking structure is disposed with several vent holes.

10. The heating and heat-dissipation synergistic thermal control device according to claim 9, wherein an air permeability at a position of the breathable layer corresponding to the hot jacking structure is smaller than an air permeability at a position of the breathable layer at an outer peripheral side area of the hot jacking structure.

11. The heating and heat-dissipation synergistic thermal control device according to claim 1, wherein the seat body is disposed with a pat body layer; the heating cushion layer is mounted on one side of the pat body layer away from the seat body; and the air channel structure comprises an air circulation hole disposed on the pat body layer.

12. The heating and heat-dissipation synergistic thermal control device according to claim 1, wherein the air channel structure comprises a wind guide structure disposed between one side of the heating cushion layer near the seat body and the heat dissipation system.

13. The heating and heat-dissipation synergistic thermal control device according to claim 1, wherein the breathable base material is disposed with heating wires, and the heating wire is densely disposed to form the heating areas.

14. The heating and heat-dissipation synergistic thermal control device according to claim 11, wherein a second airbag body is disposed between the pat body layer and the breathable layer, and an orthogonal projection of the second airbag body on the breathable layer is separate from an orthogonal projection of the heating areas on the breathable layer.

15. An automobile seat, comprising the seat body, wherein the seat body has a seat cushion and a back, wherein the seat cushion and/or the back are/is mounted with the heating and heat-dissipation synergistic thermal control device according to claim 1.

16. The heating and heat-dissipation synergistic thermal control device according to claim 2, each of the airbag groups with a corresponding islanding heating unit is a group of synergy unit, wherein the set control strategy comprises: controlling the synergy unit to switch between a first state and a second state in response to an external start signal, wherein when in the first state, the islanding heating unit is turned on, and the driving device switches the first airbag body to the inflatable state;

when in the second state, the islanding heating unit is turned off, and the driving device switches the first airbag body to the deflated state.

17. The heating and heat-dissipation synergistic thermal control device according to claim 3, each of the airbag groups with a corresponding islanding heating unit is a group of synergy unit, wherein the set control strategy comprises: controlling the synergy unit to switch between a first state and a second state in response to an external start signal, wherein when in the first state, the islanding heating unit is turned on, and the driving device switches the first airbag body to the inflatable state;

when in the second state, the islanding heating unit is turned off, and the driving device switches the first airbag body to the deflated state.

18. The heating and heat-dissipation synergistic thermal control device according to claim 2, wherein the seat body is disposed with a pat body layer; the heating cushion layer is mounted on one side of the pat body layer away from the seat body; and the air channel structure comprises an air circulation hole disposed on the pat body layer.

19. The heating and heat-dissipation synergistic thermal control device according to claim 2, wherein the air channel structure comprises a wind guide structure disposed between one side of the heating cushion layer near the seat body and the heat dissipation system.

20. The heating and heat-dissipation synergistic thermal control device according to claim 2, wherein the breathable base material is disposed with heating wires, and the heating wire is densely disposed to form the heating areas.

* * * * *